March 26, 1968      Z. KRONGOS      3,374,895
WATER FILTER DEVICE
Filed July 18, 1967
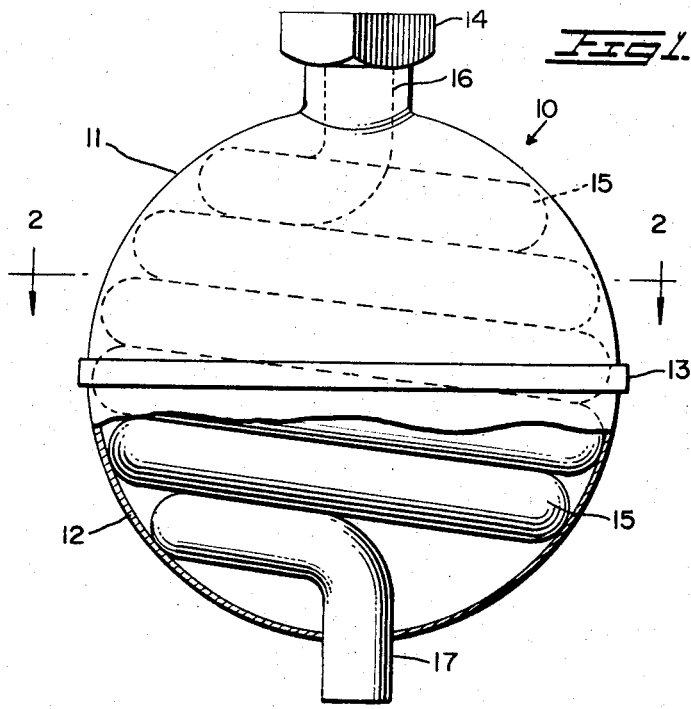
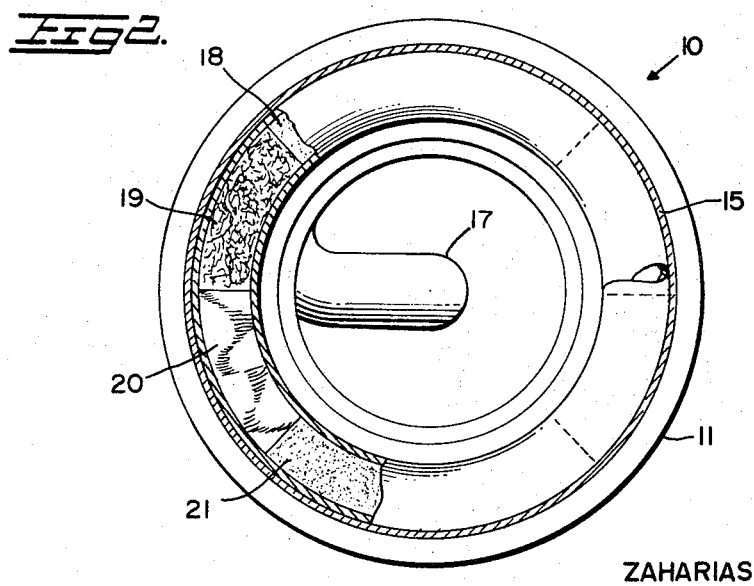
INVENTOR
ZAHARIAS KRONGOS
BY *M. Ted Raptes*
ATTORNEY

3,374,895
WATER FILTER DEVICE
Zaharias Krongos, 328 W. 49th St.,
New York, N.Y. 10019
Filed July 18, 1967, Ser. No. 654,175
3 Claims. (Cl. 210—266)

ABSTRACT OF THE DISCLOSURE

A filter adapted to be attached to faucets. The filter is comprised of a casing which contains a continuous length of coiled tubing therein. The tubing contains sequential zones of various filtering material.

---

This invention relates to water filters of the type adapted to be attached on faucets to filter and clarify water, and is especially adapted for domestic use in the home or office.

Water obtained from faucets is normally pure and potable. However, due to today's problems involving pollution of water supplies such as rivers and streams, water obtained from faucets may contain certain impurities and odors, which are desirable to be removed. The device of this invention accomplishes this desired result.

Accordingly, an object of this invention is to provide a filter having a casing adapted to be attached to a faucet and whereby said casing contains filtering material.

A further object of this invention is to provide a filter comprised of two substantially hemispherical sections which are adapted to be joined together as a unit, which will be inexpensive to manufacture, and which will not easily get out of order.

Another object of this invention is to provide a filter having a casing formed of hemispherical sections and containing therein coiled lengths of tubing which contains filtering material.

Many other objects and advantages of the filter construction herein shown will be obvious to those skilled in the art from the disclosures given and from the following embodiment of the invention.

In the accompanying drawing:

FIGURE 1 is a side elevation of the filter of the invention partially in section; and FIGURE 2 is a sectional view taken along line 2—2 of FIGURE 1.

Referring now to the drawing, the numeral 10 denotes generally the filter of the invention. The filter is comprised of two hemispherical sections 11 and 12 which are joined together by conventional means at 13 such as by screw threads and gaskets, etc. The upper end of section 11 is provided with a fitting or connector adapted to be connected as by threading to a faucet or the like.

Within said hemispherical sections there is provided a continuous length of coiled tubing 15. One end 16 of the tubing is adapted to be received within the fitting 14 and the other end 17 is adapted to protrude through the bottom of section 12. Within the tubing there is arranged sequentially various types of filtering material. Thus, one zone of the tubing contains fine sand 18, a succeeding zone contains bits of twisted brush 19, a succeeding zone contains pressed sheep's wool 20, and a zone contains crumbs of cork 21. Although the above filtering materials are particularly adapted for removing oders and organic materials from tap water, it is understood that other filtering materials suitable for the purpose may be used.

In use, the filter is attached to a faucet or the like and when the faucet is opened, water will pass through the tubing 15 and through the filtering elements placed sequentially within the tubing, which remove unwanted odors and organic materials. Filtered water is obtained at the end 17 of the tubing. In use, it was found that water so filtered was completely clarified, contained no sediment, and had no odor.

There is thus provided a filter which is easily constructed and is particularly useful as a water purifier. It may be detachably connected to usual faucets at kitchen sinks, laundry tubs, bath tubs, wash bowls, etc., in homes, offices, etc. The filter may be constructed of metal or plastic materials. Whenever the filtering elements become clogged or unusable any further to purify the water, the tubing may be removed from the casing and be replaced with tubing containing new filtering materials.

It will be understood that various changes in the details and materials herein described and illustrated may be made within the principle and scope of the invention as expressed in the appended claims.

I claim:
1. A filter for filtering tap water to remove odors and organic materials therefrom, comprising a casing, said casing containing therein a continuous length of coiled tubing, said tubing containing sequential zones of different filtering material, a fitting on said casing adapted to be attached to a faucet and the like and containing one end of said tubing, and an outlet in said casing for the other end of said tubing.

2. The filter of claim 1 wherein said casing is comprised of two hemispherical sections which are adapted to be joined together.

3. The filter of claim 1 wherein said tubing contains repeating sequential zones of sand, twisted brush, wool, and crumbs of cork.

References Cited
UNITED STATES PATENTS

| | | | |
|---|---|---|---|
| 560,261 | 5/1896 | Durant | 210—290 X |
| 977,965 | 12/1910 | Paul | 210—282 X |
| 2,368,035 | 1/1945 | Moore | 210—290 |

SAMIH N. ZAHARNA, *Primary Examiner.*